Patented Feb. 14, 1950

2,497,638

UNITED STATES PATENT OFFICE 2,497,638

COPOLYMERS OF ALKENYL DIESTERS OF ALKENYLPHOSPHONIC ACIDS WITH METHYL METHACRYLATE

Arthur Dock Fon Toy, Chicago, Ill., assignor to Victor Chemical Works, a corporation of Illinois No Drawing. Application April 24, 1946, Serial No. 664,715

9 Claims. (Cl. 260—86.1)

This invention relates to copolymers of alkenyl diesters of alkenylphosphonic acids with methyl methacrylate.

This application is a continuation, in part, of my co-pending application, Serial No. 625,460, filed October 29, 1945, now Patent No. 2,425,766, issued August 19, 1947. That application describes a process for producing monomeric beta, gamma alkenyl diesters of either alkyl or phenyl substituted ethenylphosphonic acids. That process comprises reacting beta, gamma unsaturated alcohols with alpha, beta unsaturated alkenyl phosphorus oxydichlorides in the presence of pyridine and then separating the resulting ester from the reaction mass. These esters are liquids which exhibit little or no tendency to polymerize under ordinary conditions.

I have now found that these beta, gamma alkenyl diesters of alkyl and phenyl substituted ethenylphosphonic acids may be copolymerized with methyl methacrylate to produce valuable polymers.

The character of the new polymeric compositions may be varied over a wide range depending on the polymerizing conditions and the proportions of monomeric starting esters.

The normally thermoplastic methyl methacrylate resins may be modified to give thermosetting resins of good flame resistance by copolymerizing monomeric or partially polymerized methyl methacrylate with the alkenylphosphonate monomer in suitable proportions in the presence of catalyst.

The proportions of monomeric esters which may be employed are not critical though in general it is more difficult to obtain solid type resins when the alkenyl group of the phosphonate is large. For example, when the alkenyl group contains 8 carbon atoms such as in the octenyl and styrylphosphonates, it is preferred to employ a relatively smaller amount of the phosphonate ester if solid resins are desired. On the other hand, with the lower alkenyl groups such as in the butenyl phosphonates, it is possible to readily obtain solid resins in all proportions.

In general the copolymers herein described are produced by mixing the liquid monomeric esters in the desired proportions and dissolving therein a small amount of the polymerization catalyst, and heating the mixture at a temperature below that which will cause decomposition of the starting esters. The temperature and period of heating will depend on the amount and type of catalyst employed and the degree of polymerization desired.

Suitable catalysts include the organic peroxides such as benzoyl peroxide; acetyl peroxide, tert.-butyl perbenzoate, etc. Benzoyl peroxide is generally preferred because of the ease in controlling the rate of polymerization when such catalyst is used. For example, benzoyl peroxide may be used at temperatures of 70 to 80° C. with satisfactory results whereas a peroxide like tert.-butyl perbenzoate requires a higher temperature and the rate of polymerization is so rapid that careful control is required to prevent undue decomposition.

The following table illustrates a number of examples of the production of solid resins by copolymerization of methyl methacrylate with a number of typical alkenylphosphonates.

| Phosphonate Ester | Per cent by Volume | Methyl Methacrylate Monomer, Per Cent by Volume | Benzoyl Peroxide Catalyst (g./10 cc. of monomer) | Polymerization Temperature, °C. | Period of Heating, hours | Properties of Polymer Products |
|---|---|---|---|---|---|---|
|  | 0 | 100 | 0.01 | 70 | 20 | Water-clear, hard, strong resin. |
|  | 1 | 99 | 0.01 | 70 | 20 | Do. |
|  | 5 | 95 | 0.05 | 70 | 20 | Do. |
| Diallyl isobutenylphosphonate | 10 | 90 | 0.10 | 70 | 20 | Do. |
|  | 30 | 70 | 0.15 | 70 | 20 | Do. |
|  | 50 | 50 | 0.25 | 70 | 20 | Do. |
|  | 70 | 30 | 0.40 | 70 | 20 | Light yellow, clear, hard, strong resin. |
|  | 1 | 99 | 0.01 | 70 | 20 | Water-white, clear, hard, strong solid. |
|  | 5 | 95 | 0.05 | 70 | 20 | Do. |
| Dimethallyl isobutenylphosphonate | 10 | 90 | 0.10 | 70 | 20 | Do. |
|  | 30 | 70 | 0.15 | 70 | 20 | Do. |
|  | 50 | 50 | 0.25 | 70 | 20 | Do. |
|  |  |  |  | 80 | +18 | Yellow, clear, hard, strong solid. |
|  | 70 | 30 | 0.40 | 70 | 20 | Light yellow, clear, hard, strong solid. |
|  | 1 | 99 | 0.01 | 70 | 20 | Water-white, clear, hard, strong solid. |
| Dimethallyl isooctenylphosphonate | 5 | 95 | 0.05 | 70 | 20 | Do. |
|  | 10 | 90 | 0.10 | 70 | 20 | Do. |
|  | 1 | 99 | 0.10 | 70 | 20 | Water-white, hard, strong, solid. |
| Diallyl styrylphosphonate | 5 | 95 | 0.05 | 70 | 20 | Do. |
|  | 10 | 90 | 0.10 | 70 | 20 | Water-white, sl. soft, strong, solid. |
|  | 5 | 95 | 0.02 | 70–72 | 20 | Water-white, hard, solid. |
| Dimethallyl isobutenylphosphonate | 10 | 90 | 0.05 | 70–72 | 20 | Water-white, hard, strong solid. |
|  |  |  |  | 70–72 | 20 | Do. |
|  | 30 | 70 | 0.12 | 80 | +18 | Faint yellow, hard, strong solid. |
|  | 5 | 95 | 0.02 | 70–72 | 20 | Water-white, clear, hard, solid. |
| Diallyl isobutenylphosphonate | 10 | 90 | 0.05 | 70–72 | 20 | Do. |
|  |  |  |  | 70–72 | 20 | Do. |
|  | 30 | 70 | 0.12 | 80 | +18 | Faint yellow, clear, hard, solid. |
|  |  |  |  | 70–72 | 20 | Clear, hard, strong solid. |
| Dimethallyl isooctenylphosphonate | 5 | 95 | 0.02 | 80 | +18 | Faint yellow, clear, hard, strong solid. |
|  |  |  |  | 70–72 | 20 | Clear, hard, strong solid. |
|  | 10 | 90 | 0.05 | 80 | +18 | Faint yellow, clear, hard, strong solid. |

The copolymers of the above examples containing 5% or more of the alkenylphosphonate show definite flame-resistance when compared to the normal methyl methacrylate resins.

The solid copolymers illustrated above may be produced in the form of shaped articles by polymerizing the mixtures in suitable molds. They also may be used in glass and fiber laminates by impregnating such fibers with the monomeric or partially polymerized mixtures and then completing the polymerization.

Diallyl and dimethallyl butenylphosphonates and methyl methacrylate will copolymerize in all proportions to form solid type resins, whereas octenyl and styrylphosphonates form solid polymers with methyl methacrylate only when the proportion of the phosphonate ester is less than half of the proportion of methyl methacrylate employed. Both the solid and liquid type copolymers are new products and are intended to be within the scope of the present invention.

Liquid copolymers not shown in the above examples may be produced by using higher proportions than shown above of the higher alkenyl phosphonates. For example, an equal volume mixture of methyl methacrylate and diallyl iso-octenylphosphonate when heated with approximately 2% of benzoyl peroxide at 70-80° C. for 20 hours will produce a viscous liquid product which is suitable for use as a plasticizer in a number of commercial type resins such as cellulose nitrate, ethyl cellulose, vinyl chloride-vinyl acetate copolymers, etc.

Small amounts of the alkenylphosphonate esters when copolymerized with large amounts of methyl methacrylate have a great modifying effect on the character of the methyl methacrylate resin. For example, 1% of diallyl isobutenylphosphonate and 99% of methyl methacrylate catalyzed with 0.1% benzoyl peroxide and polymerized 20 hours at 70° C. formed a clear, hard, strong resin which differed from a straight methyl methacrylate resin. The methyl methacrylate resin was soluble in chloroform, ethylene chloride, acetone, benzene, and butyl acetate, whereas the phosphonate-containing copolymer did not dissolve in these solvents, but formed soft gels after 6 days immersion in the solvents at room temperature. Substantially the same difference was observed with copolymers containing 1% dimethallyl styrylphosphonate, and 1% dimethallyl iso-octenylphosphonate. Another difference is in the fact that as little as 1% of the alkenylphosphonate in the copolymer renders the copolymer thermosetting as compared to the thermoplastic character of the straight methyl methacrylate resin.

The foregoing detailed description is given for clearness of understanding only, and no unnecessary limitations should be understood therefrom, for some modifications will be obvious to those skilled in the art.

I claim:

1. The method as set forth in claim 6 in which the catalyst is benzoyl peroxide and the heating is for a sufficient period to produce a solid resin product.

2. A solid resin product obtained by copolymerizing methyl methacrylate and a di beta, gamma alkenyl iso-octenylphosphonate in the proportions of from 2 to 99 volumes of methyl methacrylate to one volume of the iso-octenylphosphonate ester.

3. A copolymer obtained by copolymerizing 30 to 99% by volume of methyl methacrylate and 70 to 1% by volume of a beta, gamma alkenyl diester of an alkenylphosphonic acid selected from the class consisting of alkyl and phenyl substituted ethenylphosphonic acids.

4. A solid resin product comprising a copolymer obtained by copolymerizing about 30 to 95% by volume of methyl methacrylate and 70 to 5% of a di beta, gamma alkenyl isobutenylphosphonate.

5. The method of forming a thermosetting methyl methacrylate resin which comprises reacting from 30 to 99% by volume of thermoplastic methyl methacrylate with 70 to 1% by volume of a beta, gamma alkenyl diester of an alkenylphosphonic acid selected from the class consisting of alkyl and phenyl substituted ethenylphosphonic acids in the presence of an organic peroxide polymerization catalyst and at about 70 to 80° C. for a period of time sufficient to form a thermosetting resin.

6. A method which comprises reacting from 30 to 99% by volume of methyl methacrylate with 70 to 1% by volume of a beta, gamma alkenyl diester of an alkenylphosphonic acid selected from the class consisting of alkyl and phenyl substituted ethenylphosphonic acids in the presence of an organic peroxide polymerization catalyst at about 70 to 80° C. for a period of time sufficient to form a copolymer.

7. A copolymer obtained by copolymerizing 30 to 99% by volume of methyl methacrylate and 70 to 1% by volume of diallyl isobutenylphosphonate.

8. A copolymer obtained by copolymerizing 30 to 99% by volume of methyl methacrylate and 70 to 1% by volume of dimethallyl isobutenylphosphonate.

9. A copolymer obtained by copolymerizing 30 to 99% by volume of methyl methacrylate and 70 to 1% by volume of dimethallyl iso-octenylphosphonate.

ARTHUR DOCK FON TOY.

No references cited.